United States Patent
Pasi et al.

(10) Patent No.: US 8,571,195 B2
(45) Date of Patent: Oct. 29, 2013

(54) CUSTOMER SHARED CONTROL IN CUSTOMER SERVICE SCENARIOS

(75) Inventors: Alberto Pasi, Nova Milanese (IT); Mark Schmidt, Brussels (BE); Andrew D. Flockhart, Westminster, CO (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 13/193,717

(22) Filed: Jul. 29, 2011

(65) Prior Publication Data
US 2013/0028396 A1 Jan. 31, 2013

(51) Int. Cl.
*H04M 3/42* (2006.01)
(52) U.S. Cl.
USPC .................. 379/205.01; 379/265.01
(58) Field of Classification Search
USPC .................. 379/45, 67.1, 85, 114.21, 265.06, 379/265.09; 709/204; 455/416
See application file for complete search history.

(56) References Cited

U.S. PATENT DOCUMENTS

| | | | |
|---|---|---|---|
| 2002/0062347 A1* | 5/2002 | Low et al. | 709/204 |
| 2004/0184584 A1* | 9/2004 | McCalmont et al. | 379/45 |
| 2005/0147228 A1* | 7/2005 | Perrella et al. | 379/265.06 |
| 2008/0139188 A1* | 6/2008 | Purontaus et al. | 455/416 |
| 2008/0212767 A1* | 9/2008 | Charlson | 379/265.09 |
| 2009/0208303 A1 | 8/2009 | Brunner | |
| 2010/0111274 A1* | 5/2010 | Bayne | 379/114.21 |
| 2010/0226482 A1* | 9/2010 | Naparstek et al. | 379/85 |

* cited by examiner

*Primary Examiner* — Mohammad Islam
*Assistant Examiner* — Van D Huynh
(74) *Attorney, Agent, or Firm* — Kavinsky Daisak PLLC; John Maldjian, Esq.; Alexander D. Walter, Esq.

(57) ABSTRACT

Provided herein is a system and method for sharing control of a customer service provided by a contact center. The method may include: receiving, from a customer, a customer contact to request the customer service; communicating by use of a communication channel between the customer and the contact center in order to provide the customer service; receiving a join request, from the customer, to join an outside party to the customer service; and joining the outside party to the customer service.

26 Claims, 12 Drawing Sheets

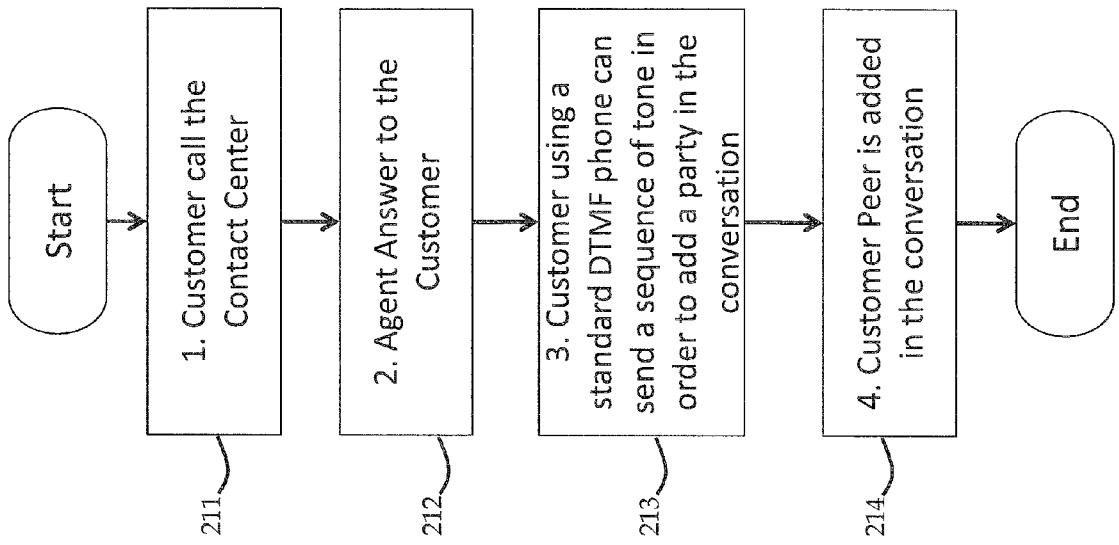
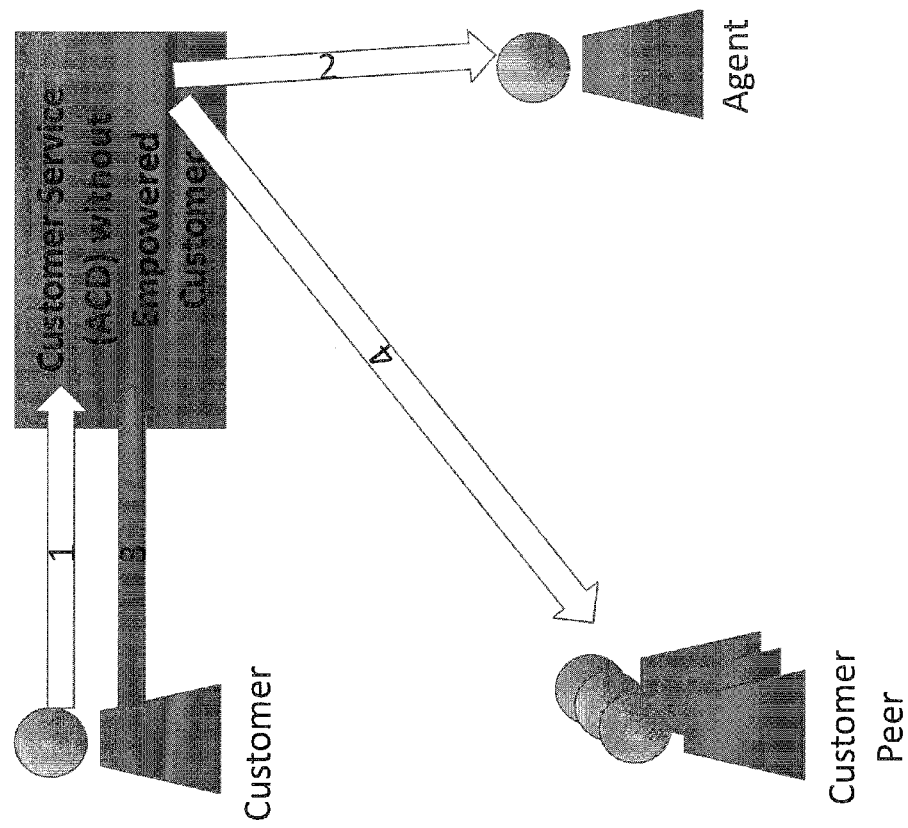
FIG. 2C

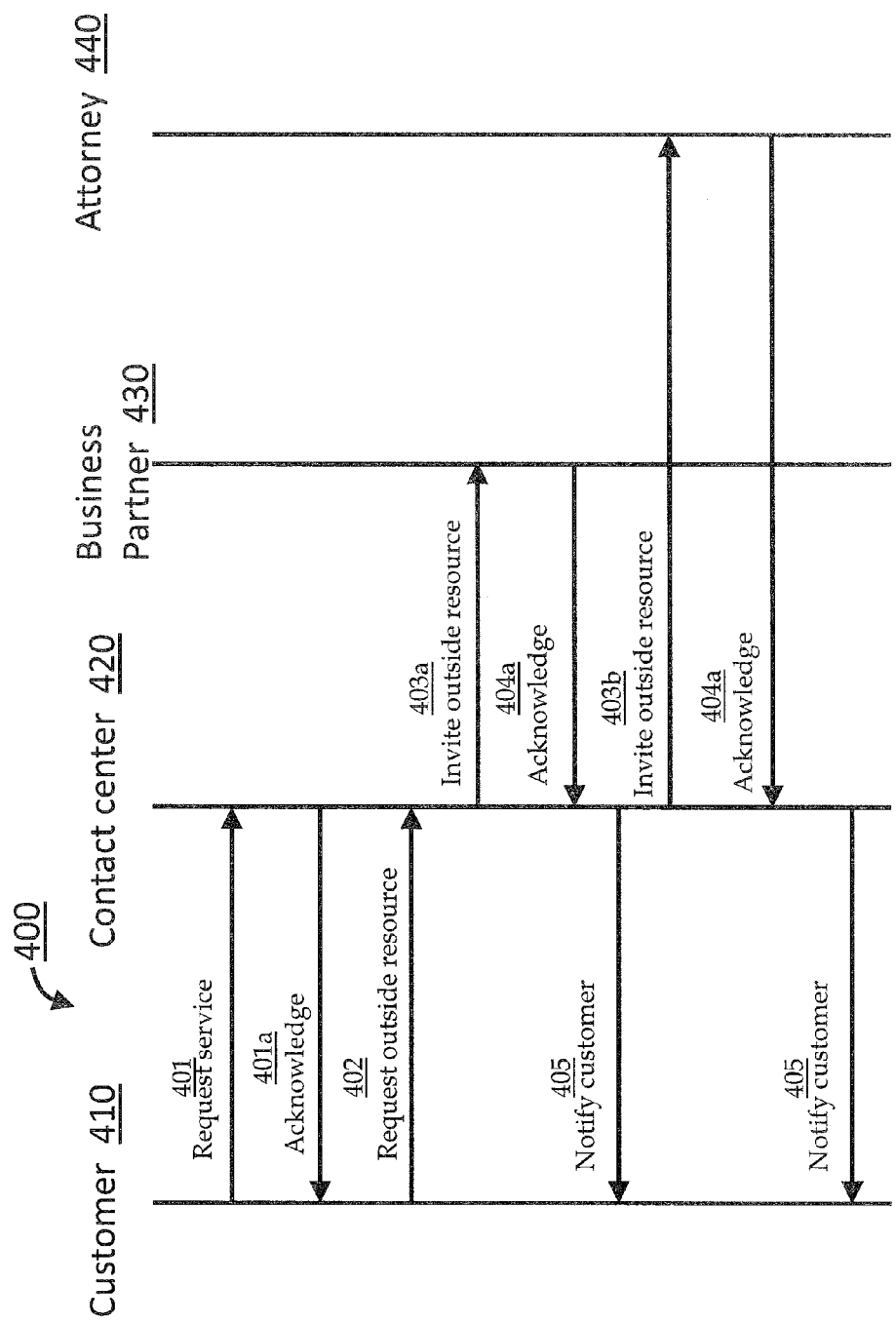

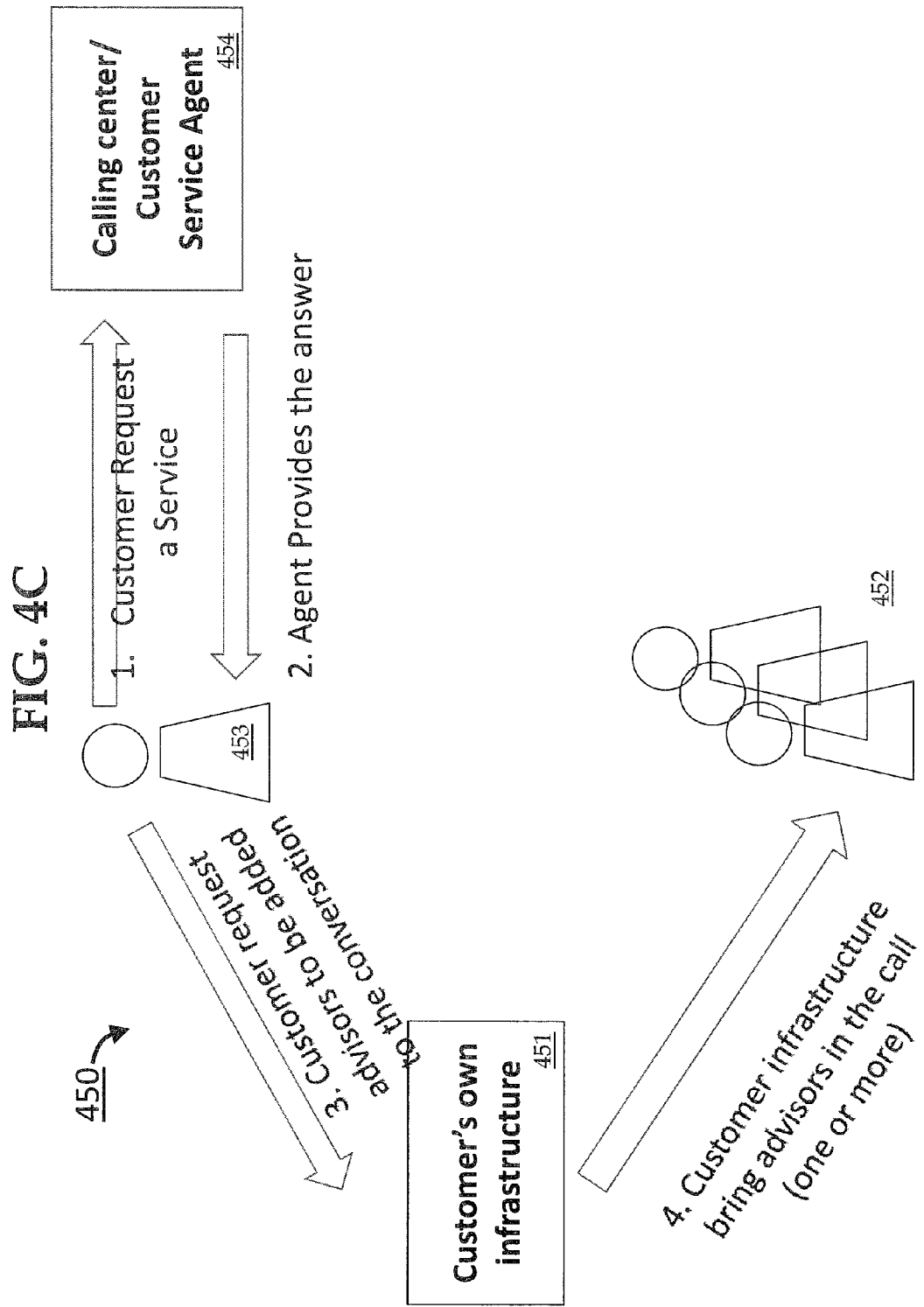

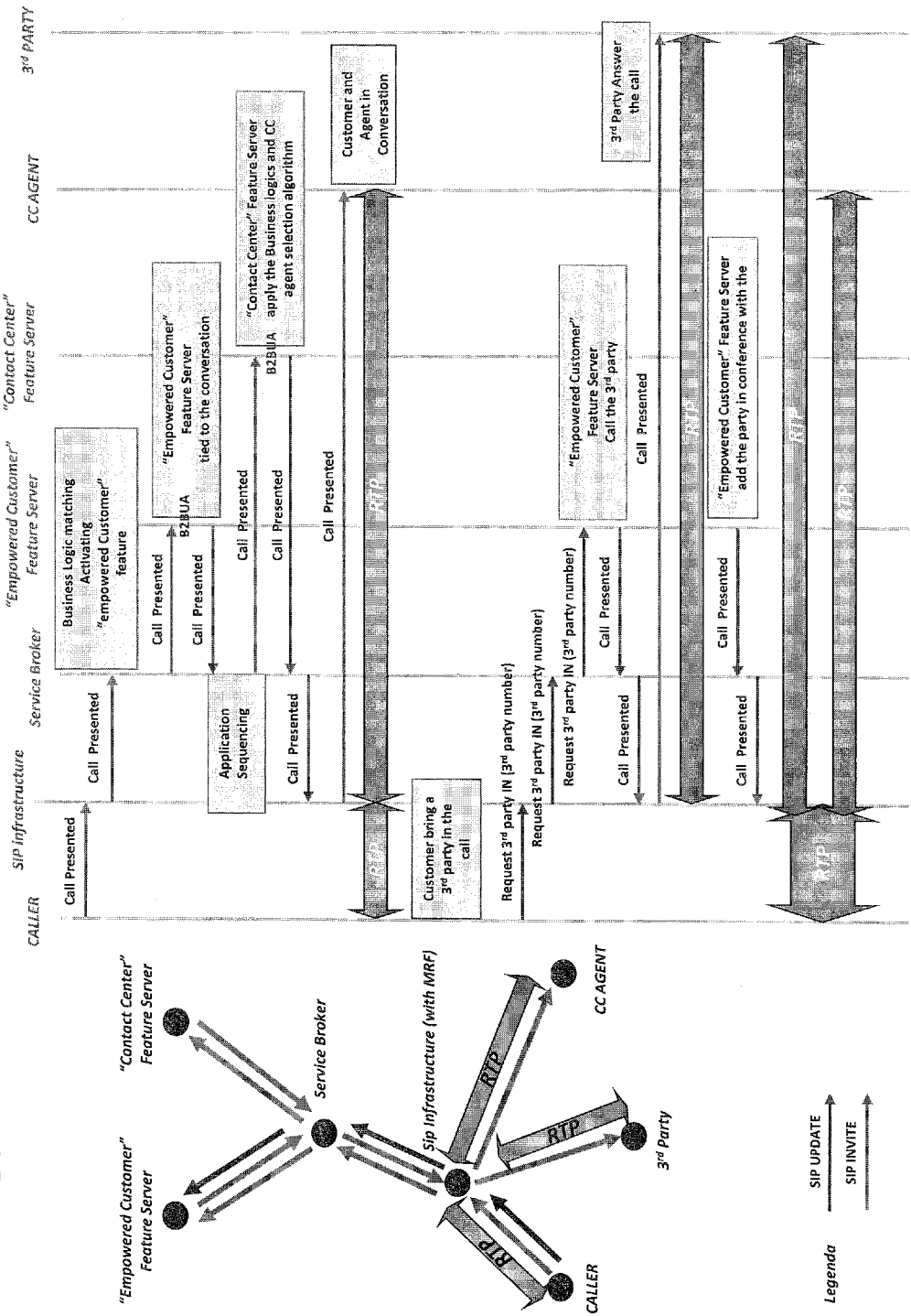

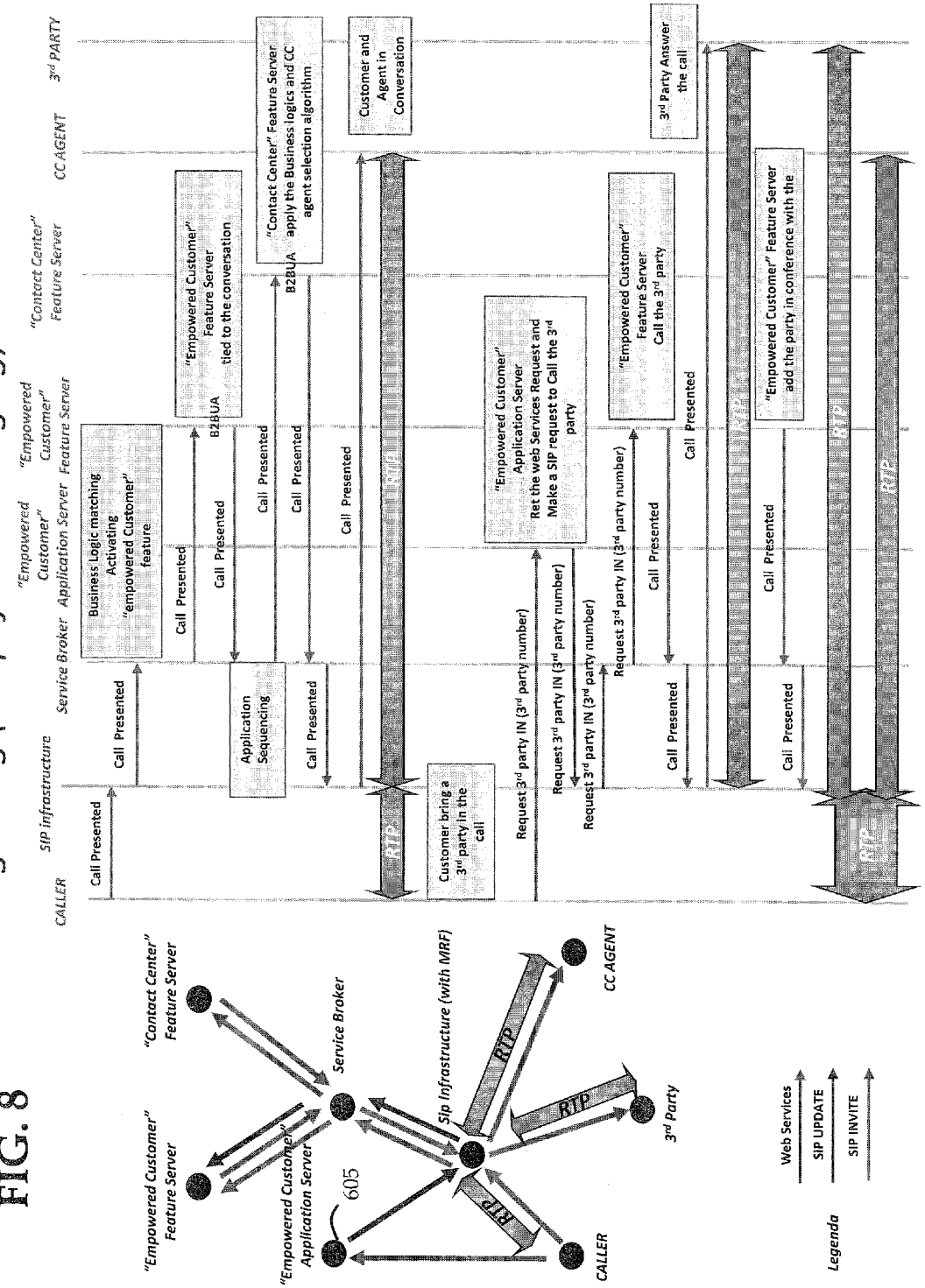

CUSTOMER SHARED CONTROL IN CUSTOMER SERVICE SCENARIOS

BACKGROUND

1. Field of the Invention

Embodiments of the present invention generally relate to contact centers and a shared control of a contact environment between a customer or a potential customer (generically, "customer") and a service agent, and, in particular, to a system and method for taking control and action by either the customer or the service agent during a customer contact with a contact center.

2. Description of Related Art

Call centers are commonly used by service providers or manufacturers (collectively, "vendors") to provide customer support. Customers requesting customer support may contact the call center by telephone. As additional methods of communication between agent and customer have been developed such as, but not limited to, e-mail, instant messaging, web chat, and so forth, call centers have evolved into contact centers in order to handle communication by a variety of methods, i.e., beyond telephone calls. An instance of a customer contacting a contact center by any of these methods will be referred to herein as a customer contact. In contact centers, quickly finding and assigning a well-qualified service agent to service and fulfill a customer's need is important in providing improved customer satisfaction.

Known systems and methods for handling a customer contact in a contact center include providing choices to the customer prior to connecting with a service agent or after completing a call with the service agent, but these choices are generally limited in what is allowed. Once the consumer is connected to a service agent, control by the customer generally is further limited or ceases, and it is the service agent who is in control of the customer contact environment. Even if the service agent and the consumer are collaboratively co-browsing, sharing control of a web session and a web page on view, other aspects of the customer contact are not collaborative but rather are controlled by the service agent, almost exclusively. The customer, not being in control of the other aspects, does not perceive to be empowered to control the customer contact. Multiple customer contacts may be needed to answer an inquiry or to resolve a problem, leading to inefficiencies and increased costs. The customer's perception may negatively affect their satisfaction with the customer contact and with the vendor.

Therefore, a need exists to provide shared control of a customer contact environment during a customer contact between a customer and service agent, in order to provide a closer and more loyal customer relationship, and ultimately improved customer satisfaction.

SUMMARY

Embodiments of the present invention generally relate to a system and method for shared control of a customer contact environment between a customer and a service agent, and in particular to a system and method for taking control and taking action by either the customer or the service agent during a customer contact with a contact center.

In one embodiment, a method to share control of a customer service provided by a contact center comprises: receiving, from a customer, a customer contact to request the customer service; communicating by use of a communication channel between the customer and the contact center in order to provide the customer service; receiving a join request, from the customer, to join an outside party to the customer service; and joining the outside party to the customer service.

In some embodiments of a method, the outside party joins the customer service by use of a communication channel controlled by the contact center.

In some embodiments of a method, the outside party joins the customer service by use of a communication channel controlled by the customer.

In some embodiments of a method, the method further comprises: permitting access by the customer to a presence status of the outside party, wherein the join request is received if the presence status indicates the outside party is available.

In some embodiments of a method, the method further comprises: limiting control of the customer service allowed to the customer.

In some embodiments of a method, the method further comprises: approving the outside party before the outside party is joined to the customer service.

In some embodiments of a method, the method further comprises: receiving an on-call status of an outside party.

In some embodiments of a method, the method further comprises: creating a recording of the customer service in response to an activate-recording command received from the customer.

In some embodiments of a method, the method further comprises: providing the recording in response to a recording request from the customer.

In some embodiments of a method, the method further comprises: providing a feedback survey in response to a feedback survey request received from the customer.

In some embodiments of a method, the feedback survey is provided before the completion of the customer contact.

In some embodiments, the communication channel is configured to receive the customer contact, and the communication channel configured to provide the customer service, are in communication with an application web server.

In one embodiment, a system to share control of a customer service comprises: a communication channel receiver configured to receive a customer contact to request service; a communication channel transmitter configured to transmit the customer service over a communication channel; a communication module configured to receive a join request, from the customer, to join an outside party to the customer service; and a joining module configured to join the outside party to the customer service.

In some embodiments of a system, the joining module joins the outside party by use of a communication channel controlled by the system.

In some embodiments of a system, the joining module joins the outside party by use of a communication channel controlled by a customer.

In some embodiments, a system further comprises: a presence determination module configured to determine a presence status of the outside party, wherein the joining module joins the outside party if the presence status indicates that the outside party is available.

In some embodiments, a system further comprises: a limiting module configured to limit control of the system allowed to a customer.

In some embodiments, a system further comprises an approval module configured: to analyze the outside party; and to permit joining the outside party by the joining module only if approved by the approval module.

In some embodiments, the system is configured to receive an on-call status of an outside party.

In some embodiments, the system further comprises a recording module configured to record the customer service in response to an activate-recording command received from a customer.

In some embodiments, the system further comprises a recording in response to a recording request from the customer.

In some embodiments, a system further comprises: a survey module configured to provide a feedback survey in response to a feedback survey request received from a customer. In some embodiments, the feedback survey is provided before the completion of the customer contact.

In some embodiments, the system further comprises an application web server in communication with: the communication channel configured to receive the customer contact; and with the communication channel configured to transmit the customer service.

In one embodiment, a system comprises a computer server, the computer server comprising a tangible computer readable medium comprising program instructions, wherein the program instructions are computer-executable to implement: receiving, from a customer, a customer contact to request the customer service; communicating by use of a communication channel between the customer and the contact center in order to provide the customer service; receiving a join request, from the customer, to join an outside party to the customer service; and joining the outside party to the customer service.

In some embodiments, a system further comprises an application web server configured to communicate with the customer.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 2C is a method for controlling a customer contact in accordance with an embodiment of the present invention;

FIG. 3 is a message transfer diagram of a process at a high level of abstraction in accordance with an embodiment of the present invention;

FIG. 4A is an example of establishing a financial transaction in accordance with an embodiment of the present invention;

FIG. 4C is a scenario using the customer's own communication infrastructure, in accordance with an embodiment of the present invention;

FIG. 7 is an embodiment of a call flow diagram at a lower level of abstraction, in accordance with the present invention; and FIG. 8 is another embodiment of a call flow diagram at a lower level of abstraction, in accordance with the present invention.

DETAILED DESCRIPTION

Figure 1:
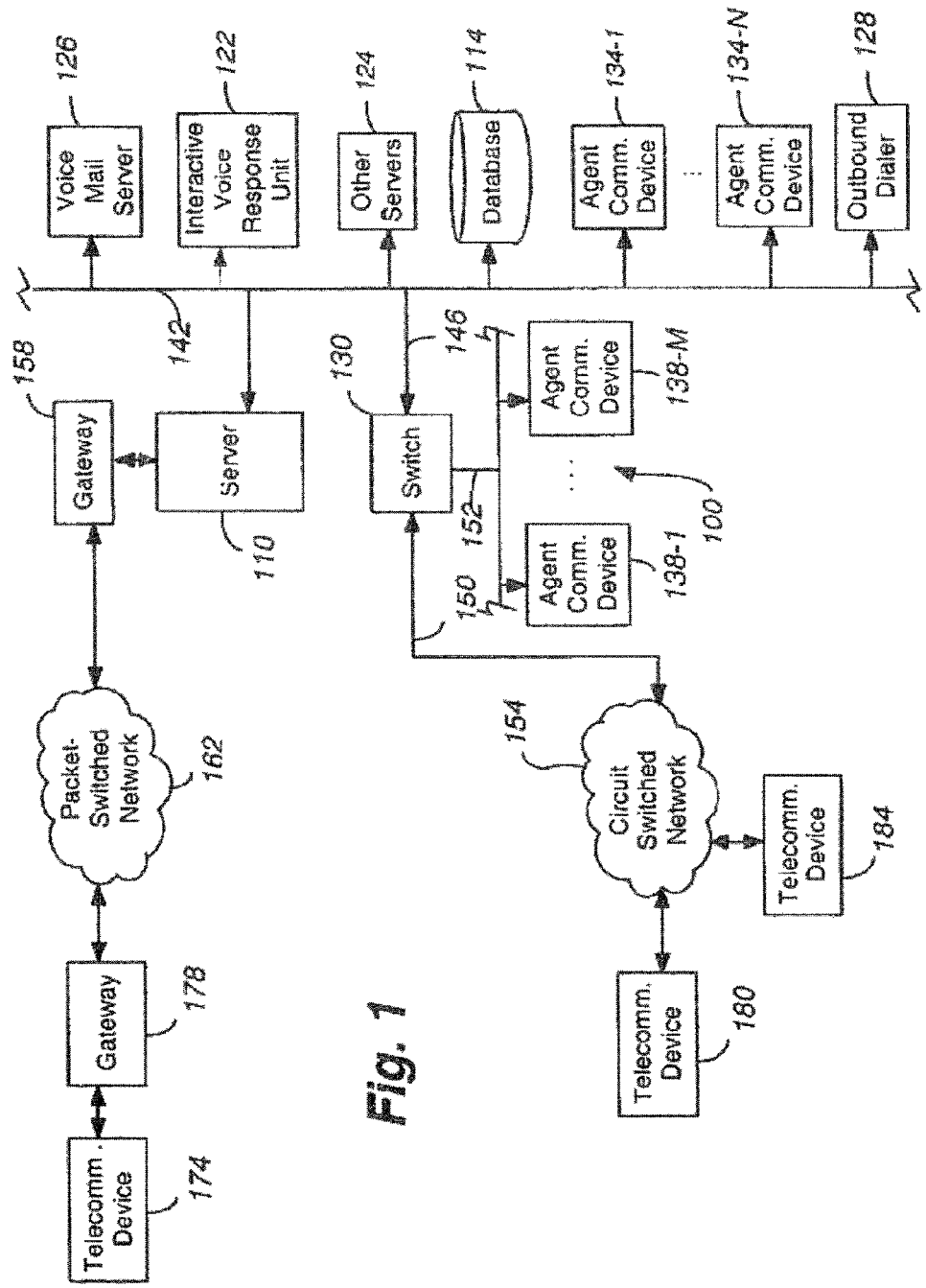
FIG. 1 is a block diagram depicting a contact center in accordance with an embodiment of the present invention.

Embodiments of the present invention generally relate to a system and method for shared control of a customer contact environment between a customer and a service agent. More specifically, embodiments of the present invention relate to a system and method for taking control and taking action by either the customer or the service agent during a customer contact session with a contact center.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

As used herein in connection with embodiments of the present invention, the term "empower" refers to an ability by a party (e.g., a customer) to exercise rights, abilities, functions and so forth, which had been formerly and exclusively reserved for exercise by another party (e.g., a service agent).

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones, such as Avaya Inc.'s, IP Softphone™; Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and can include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2A:
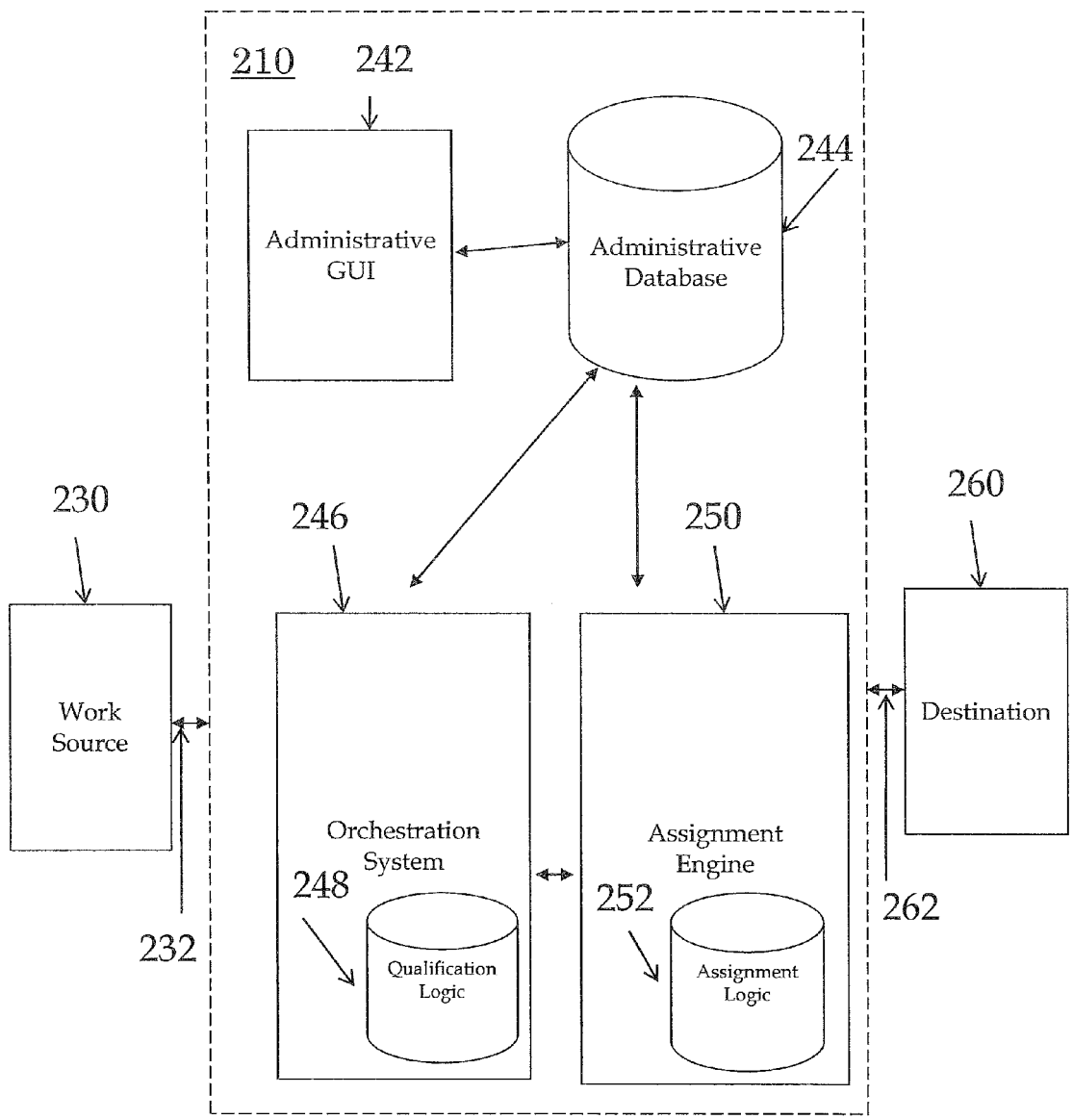
FIG. 2A is a system level block diagram depicting an administrator server in accordance with an embodiment of the present invention.

Referring to FIG. 2A, which depicts a block diagram of a server 210 in accordance with an embodiment of the present invention, there is provided a server 210 in communication with a work source 230, which may comprise customer or any other entity capable of originating a transmission of work or a contact. The server 210 may be configured in communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also be in communication with a destination 260, which may comprise an agent or any entity capable of receiving a transmission of work or a contact. The server 210 may be configured in communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Definity™ Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center—Express™, Contact Center Manager Server™, Contact Center Portfolio™, and Messaging 100/150 Basic Contact Center™.

In many embodiments, the server 210 may be a stored-program-controlled system that conventionally includes, for example, interfaces to external communication links, a communications switching fabric, service circuits (e.g., tone generators, announcement circuits, and the like), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252. In accordance with some embodiments of the present invention, the qualification logic stored in the qualification logic database 248 and the assignment logic stored in the assignment logic database 252 may comprise any logical set of steps or sequences configured to process data at the call center in accordance with any embodiment of the present invention.

The server and/or switch can be a software-controlled system including a processing unit (CPU), microprocessor, or other type of digital data processor executing software or an Application-Specific Integrated Circuit (ASIC) as well as various portions or combinations of such elements.

Figure 2B:
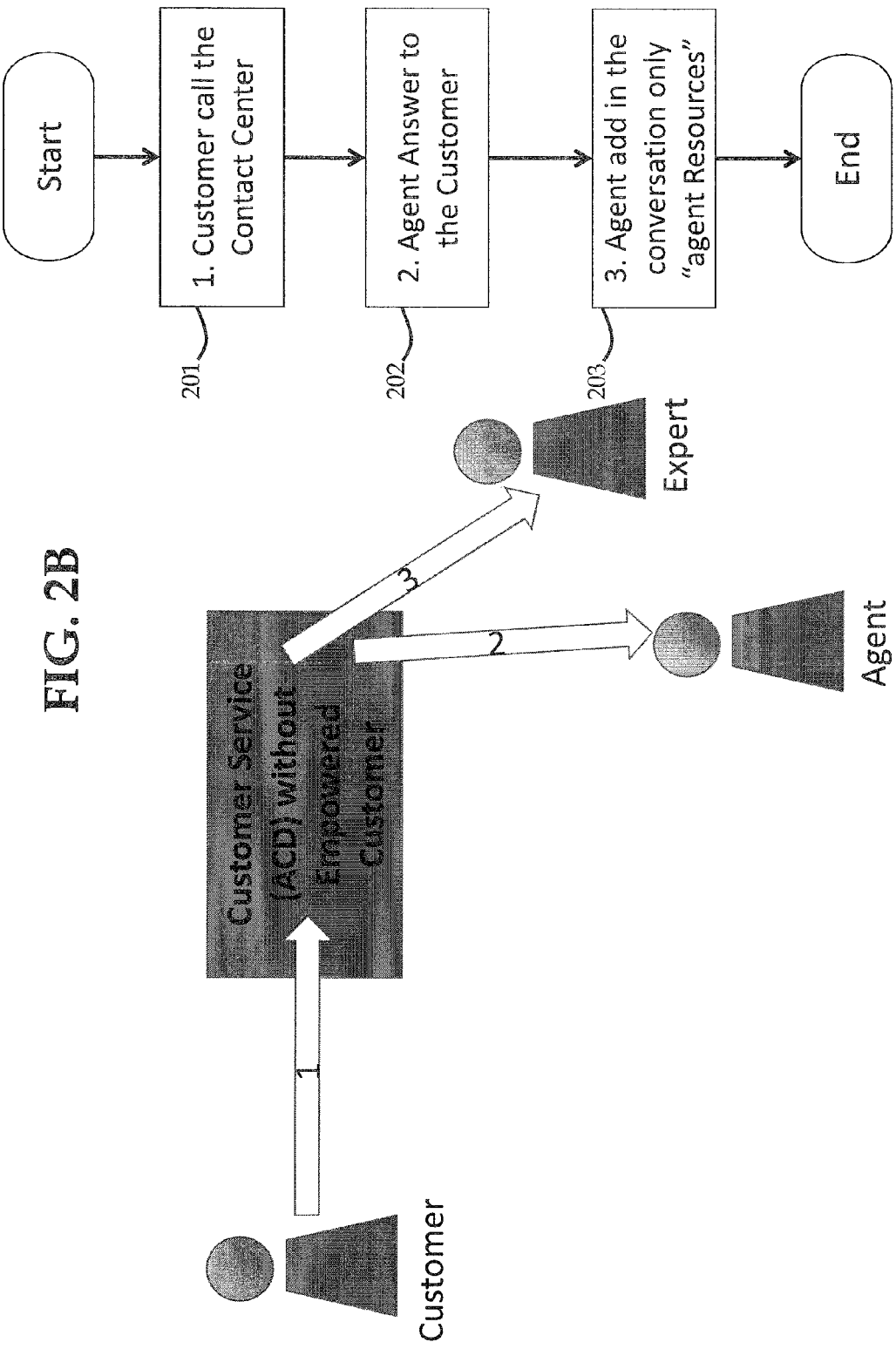
FIG. 2B is a method for controlling a customer contact.

FIG. 2B illustrates at a high level of abstraction a method for the establishment and conduct of a customer contact. At step 201, the customer calls the contact center. At step 202, the service agent answers the call. At step 203, the agent may add to the call only "agent resources" as determined by the agent.

FIG. 2C illustrates at a high level of abstraction a method for the establishment and conduct of a customer contact in accordance with an embodiment of the present invention, as will be more fully described below by use of further illustrations and examples. At step 211, the customer calls the contact center. At step 212, the service agent answers the call. At step 213, the customer decides to add an outside person (e.g., peer, advisor, etc.) to the call, and is able to do so directly by himself/herself (e.g., by use of DTMF tones on a telephone keypad). At step 214, the customer's outside person has been added to the conversation. Note that, as used throughout herein, "conversation" and "call" are synonymous unless the surrounding context clearly indicates otherwise.

Embodiments of the present invention provide a system and method for handling a customer contact in a way that "empowers" the customer, allowing the customer to be able to take the control and take actions during the customer contact with a service agent.

The consumer is empowered to add parties to the conference; initiate recordings of a session; request copies of a recording; supply a rating or comment; request a survey or register a complaint without being requested to do so; create a private conversation between the consumer and his or her partners on the conference that temporarily excludes the enterprise agent and any other parties introduced to the conference by the agent.

Modern practice in managing customer contacts with contact centers has been evolving toward empowering customers, and businesses have responded with marketing and service initiatives involving "customer focus" or "customer empowerment," i.e., an emphasis on providing more information, functions, and choices to a customer during a customer contact session.

The customer empowerment in connection with a customer contact includes at least two areas: (1) increased access to information ahead of making a product or service choice, and (2) increased ability to publicly register an opinion following the use of a product or service. A communication method or forum may include one or both areas, and may further include an ability to control access to these areas. For example, a customer may establish and/or communicate via discussion forums, blogs, YouTube™, Flicker™, and the like. Customers may also control access via privacy settings (e.g., "moderator", public or private, etc.).

Between the time of initially accessing information and the time of registering a public opinion related to the vendor, the customer is ordinarily in a period of communication with the vendor's contact center. This is a critical period when the customer is evaluating whether their expectations from the information obtained ahead of a transaction matches their actual experience. The customer may then further evaluate whether their experience is of such a nature as to call for a public commentary on the quality of the customer contact, either positively or negatively.

Embodiments of the present invention empower the customer during a customer contact. As part of the empowerment, the customer may access features and information, and therefore choices, which in the known systems or processes are available only to the service agent. Such choices may include the ability to bring a third party such as a "subject matter expert" into a conversation or the ability to initiate a recording of the customer contact, e.g., a recording of a voice conversation or a web chat dialog. The ability to bring a third party into a conversation may be useful in circumstances in which the infrastructure (e.g., the customer's mobile phone) lacks the ability to bring a third party into the conversation. In this situation, the contact center infrastructure is used to join the parties in the conversation. The ability to record the conversation may be either by use of a customer-provided recording device, or by use of a system-provided recording module that the customer can activate for recording. The recordings will be stored into an appropriate storage device. The choice of features should be available for any kind of access device used by a customer (e.g., telephone, personal computer web browser, mobile phone, smart phone, kiosk, etc.). In this way, customers have additional control over the customer contact, and from that the customers can derive additional customer satisfaction.

Modern customers are more empowered than in the past in many ways, including access to information when selecting products or services, and in the ability to record their opinion of these products and services. Vendors often respond by striving to be customer driven or customer focused, e.g., to proactively provide goods and services motivated more by customer demand than by constraints of vendor capacity or ability.

However, it is difficult for vendors to differentiate themselves in terms of customer empowerment, because access to information and the ability to record opinions about products and services are largely outside the vendor's control. Differentiation by vendors may involve how the vendor tries to put the customer at the core of the service by analyzing and leveraging more customer information in their interactions with the customer. The customer information may include customer history, buying habits, customer feedback, etc. such that the vendor may be able to build "contextualized" and "personalized" customer services may deliver one or more of: identifying and assigning the most effective service agent to serve the customer; and personalized wait treatment Personalized wait treatment as referred to herein includes a method to provide a wait treatment (i.e., a wait experience) to a customer based on the information that is known about the customer. For instance, instead of playing message like "please wait and an agent will assist you soon," the system can play a message like "Good Morning Alberto, your order shipment status is XXX, are you calling about this order? If you would like to talk with an agent, then please stay on the line"; proactive notification of scheduled maintenance, upgrades, recalls, and the like; having on call a subject matter expert knowledgeable with the vendor's product; and quality of service.

Operation of a contact center is important to a vendor in order to serve its customers and manage relationships with its customers. Therefore, it is important to understand the technology, devices and capabilities, and the preferences and experience that today's customers possess and may use when contacting a vendor through a contact center.

Customers today, compared to the past, are more mobile, able to find information easily on the internet, and interconnected through social media web sites such as FaceBook™. Such customers may also be more impatient and distracted than ever before. Customer-focused personal computer technology (including low cost netbooks, touch screens, browser based applications, and enhanced graphical user interfaces), high speed internet access (such as DSL or cable), and next generation mobile technology and mobile service providers (including smart phones, PDAs, texting and messaging services, and low cost mobile internet service), have enabled ubiquitous access to compelling sources of social collaboration and information (social collaboration forums, instant messaging, email, blogs, and Wikis to name just a few). As a result, a new classification of customers has evolved. We may refer herein to these customers as "Customer 2.0" individuals. We may further refer herein to the types of devices used by such customers as either a "Device 2.0," a "2.0 Device" or simply a "compatible device" if the surrounding context makes clear that that is what was intended. Customer 2.0 and Device 2.0 refer to ways to describe a new consumer generation. In particular Device 2.0 are devices with more intelligence (e.g., PDA, iPAD, Andriod, etc.) in which a user can install applications (i.e., user apps), software for computer communications (e.g., instant messaging, Skype or other voice/video software, etc.). These devices may allow the customer a deeper and richer experience while accessing Customer Services.

Customer 2.0 individuals are more mobile and better informed than customers in the past, and they expect vendors to support them with quality service by use of the customer's preferred communication channel(s) or mode(s). Such customers may communicate in many places with many possible communication devices. Such customers expect that, when automated and/or assisted service or support is needed, they will receive consistently high quality of service, no matter the device, location, or context in which they reach out to the vendor.

However, although the customer is receiving an improved level of service compared to service in the past, the customer still is not fully "empowered" to control a customer contact. For instance, the customer may not able to join a third party such as a peer, a trusted individual, an independent expert, etc., into the conversation. Presently, only a service agent may join a third party in this way.

To address the problem of a lack of empowerment by a customer, embodiments of the present invention include an ability to empower a customer (at least during a customer contact) to add an additional resource (e.g., an independent expert) to the customer contact. The customer may be well equipped and substantially continuously connected to a WAN (e.g., the internet). Empowering a customer in this way will tend to leverage (i.e., take advantage of the features of) computationally powerful devices available to the customer (e.g., PDA, Smartphone, Netbook PC, etc.).

Devices operating according to an embodiment of the present invention may allow the customer to start and maintain an "enhanced" conversation As referred to herein, an enhanced conversation includes capabilities to allow the customer to control the conversation (e.g., adding parties, temporally muting some parties, etc.), rating the conversation (5 star vs. 1 start), and so forth as described in more detail herein, and pass "real-time contextualized data" Real-time contextualized data as referred to herein includes a capability to pass real-time information during the call, (e.g., rating the call, sending instructions to mute parties, etc.) to the service agent. In this way, embodiments of the present invention empower the customer by shifting control of the customer contact from the service agent to the customer while taking advantage of the features of computationally powerful devices.

In situations where the customer may be using a mobile device, the customer may not have direct access to a robust communication infrastructure. In that situation, embodiments of the present invention may be able to control the customer contact by using and controlling the robust communication infrastructure of the contact center in order to add resources to the customer contact.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is a simple protocol that facilitates peer-to-peer communication sessions. Users or any other addressable entities in a SIP framework are identified by Universal Resource Identifiers (URI). Each such Internet-style address (for example, sip: johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

FIG. 3 illustrates a message transfer diagram of process 350 at a high level of abstraction in accordance with an embodiment of the present invention. Process 350 is configured such that customer 310 controls the customer contact in order to add outside resources 330 to the customer contact by use of the robust communication infrastructure of the contact center 320, or a service provider that decided to offer their infrastructure to their customer.

Process 350 begins when customer 310 sends message 301 to contact center 320 in order to initiate a customer contact session. Customer 310 may be sending request 301 from a compatible device, such as an iPhone/iPad application, a Web browser, or a Widget App. This request is delivered to contact center 320 using an enhanced communication protocol like Session Initiated Protocol ("SIP") that allows extra context to be passed with the communication itself. Contact center 320 sends acknowledgement 306 and then applies known processes in order to find a highly qualified and available agent in order to serve the customer. Contact center 320 then connects the customer 310 with a service agent in contact center 320.

Next, customer 310 sends message 302 to contact center 320 in order to request that outside resource 330 be added to the customer contact. Message 302 includes sufficient information to identify outside resource 330.

Next, contact center 320 sends an invitation message 303 to outside resource 330 in order to add outside resource 330 to the customer contact.

Next, outside resource 330 sends an acknowledgement message 304 to report whether or not outside resource 330 accepts being added to the customer contact. If outside resource 330 accepts, then contact center 320 establishes a communication channel between contact center 320 and outside resource 330, using the communication channel resources of contact center 320. Process 350 will then send a notification message 305 to customer 310 in order to notify customer 310 that outside resource 330 has been added to the customer contact.

However, if outside resource 330 does not accept the invitation to be added to the customer contact, then no communication channel is established to outside resource 330. Message 305 is sent to notify customer 310 that outside resource 330 was not added to the customer contact, optionally along with a diagnostic code. A failure to accept the invitation may be due to factors such as unavailability of a person or, if outside resource 330 is a feature such as voice recording, unavailability of the requested resource.

Alternative embodiments of the present invention may include using presence information by a customer. Presence information is known as a status indicator that conveys ability and willingness of a user or other potential communication partner to communicate. Presence information may include a listing of the best communication method to be reached (e.g., phone, text message, instant messaging, etc.). Processes to support a customer contact may involve the service agent at the contact center using presence information in order to invite an expert based on their presence.

In an alternative embodiment, the customer may also have access to presence information relating to a source of information such as the customer's own support community, which is not available to the service agent. By giving control to the customer, the customer may utilize presence information when inviting an outside resource to the customer contact.

In an alternative embodiment of the present invention, there may be a limit on the control given to the customer by the service agent and/or the contact center. Mutual agreement between the service agent and the customer is ordinarily required before limited control is provided to the customer.

In an alternative embodiment of the present invention, there may be filter imposed on the customer by the service agent and/or the contact center. The service agent and/or the contact center also wish to impose a filter that is invoked when adding an outside resource, in particular a person, such that the proposed party is checked against a prohibited list before allowing the proposed party to be added to the customer contact.

Alternative embodiment of the present invention may implement one or more of the following options:
- The service agents may receive an indication of which parties are on a call at all times, including those invited by the customer.
- Service agents and customers should be able to use a multi-party conference to capture verbal agreement from all parties involved in a business contract.
- Customers should be able to request that a copy of the call recording be sent as soon as the conference has been completed. The copy may be by way of an audio recording which is sent electronically (e.g., by email).
- Customers should be able to request that they be connected to a survey application to provide feedback or register a complaint as soon as the call with the agent has been completed. Customer can "rate" real-time the conversation (e.g., from one to five stars) and this can be used to take different action by the contact center and/or the service agent based on the rating. Rating can be used by the enterprise for different business goals, such as paying a customer contact agent based on the quality of the service given to the customer rather than by the quantity of calls answered (i.e., quality vs. quantity).
- Customers can use the "empowered customer" capabilities to leverage existing solutions like pager or locator applications in order to establish contact with an important party, without regard to how to reach the important party, for instance if incomplete contact information is available.

Compared to known art, embodiments of the present invention provide benefits that include having the customer being able to control of the customer contact. Further to this benefit, the customer can join (i.e., add) a third-party resource to the customer contact by use of the customer's communication and serving infrastructure. In an alternative embodiment, the customer may request that the service agent or contact center offer their communication and serving infrastructure to the customer to allow the customer to join the third-party resource to the customer contact. This alternative embodiment may be useful in situations (e.g., buying a product) for which a service provider may allow a customer to control the conversation, thereby empowering the customer to access the vendor's customer service, if necessary.

Embodiments of the present invention may offer additional capabilities to "empowered" a customer, such as:
- Allowing the customer to request that a conversation be recorded, and download the recording (or receive it via email) for future reference;
- Allowing the customer to mark a conversation as "private"—i.e., the customer can select to exclude the service agent from a conversation in order to have a private discussion between the customer and a peer; and
- Allowing the customer to rate the conversation—i.e., allowing a customer to provide real-time feedback regarding the customer contact. In contrast, known systems gather feedback regarding the customer contact by use of polling, a post call survey, or the like, which ordinarily take place well after the fact.

Embodiments of the present invention are adaptable to be used in a variety of situations and applications, beyond providing vendor support to a customer. For instance, several Example Scenarios are provided below in order to illustrate how embodiments of the present invention may be used to facilitate business or social transactions in a variety of situations.

Figure 4B:
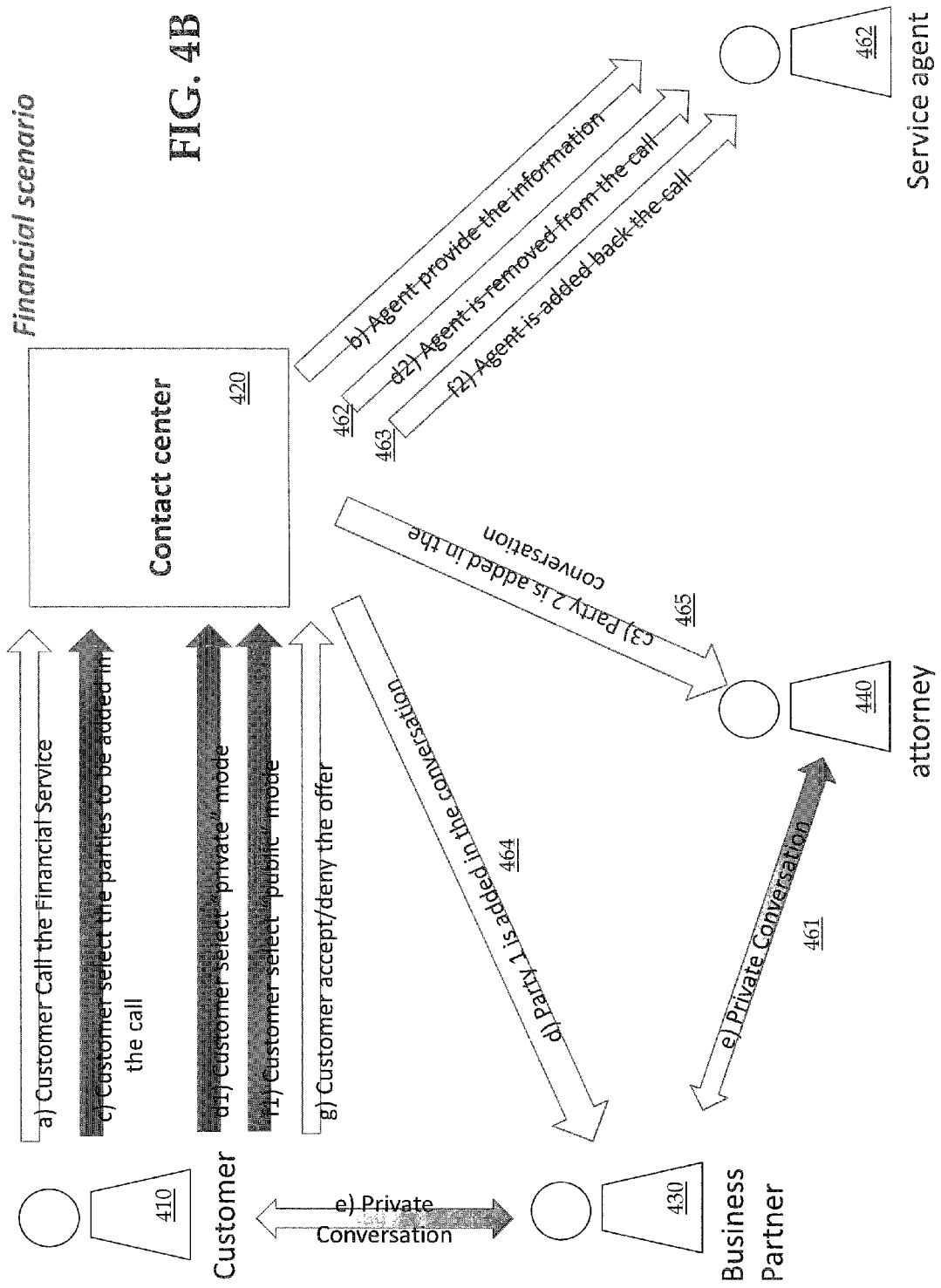
FIG. 4B is an example of establishing and conducting a financial transaction in accordance with an embodiment of the present invention.

Example Scenario 1A (FIG. 4B)

A Financial Transaction Using a Calling Center Communication Infrastructure

In a financial transaction scenario, a customer may contact a service agent at a financial institution, and during the course of the call may have a need to speak to third-parties such as a manager or a legal advisor. The customer may also want to have a private conversation between the manager and the legal advisor, excluding the service agent. Conventionally, handling this situation according to known art may involve the following steps:

1) The customer makes a first call to contact the financial institution;

2) The customer requests and receives the needed information from the financial institution, but does not further proceed with a transaction at this time;

3) The customer ends the first call, between the customer and the service agent, and makes a second call to an outside advisor to discuss the information;

4) Optionally, the customer may sequentially make additional calls to other outside advisors such as a business partner or an attorney. At least some of the calls may be treated as private, but there are no features in particular that enforce the privacy;

5) The customer ends all calls with outside advisors;

6) The customer calls back the service agent and/or the calling center in order to resume the interrupted transaction from step 1;

7) The customer further discusses the offer from the financial institution in light of discussions with the outside advisors. The customer may accept or deny the offer form the financial institution. If an updated offer or a counteroffer is made by the financial institution, another round of calls may be made between the customer and the outside advisors; and 8) The call between the customer and the service agent or contact center is ended.

In contrast, embodiments of the present invention are able to accomplish the same financial transaction with a fewer number of phone calls. Although described below in terms of a telephone call, it should be understood that embodiments of the present invention are not limited in this respect, and may include other communication methods such as a web chat. An example of establishing such a transaction in accordance with an embodiment of the present invention is illustrated in FIG. 4A as message flow 400. FIG. 4B illustrates an example of establishing and conducting such a transaction in accordance with an embodiment of the present invention, as described by the following steps.

1) Customer 410 makes a first call 401 to contact the contact center 420 of the financial institution. An optional acknowledgement 401a may be sent by contact center 420. In the context of a telephone call, an acknowledgement may be simply answering the phone call;

2) Customer 410 requests and receives the needed information from the financial institution, but customer 410 needs to contact an outside advisor to discuss the information;

3) Customer 410 selects the outside advisor(s) to add to the call (e.g., business partner 430 or attorney 440), and the phone number of the outside advisor is transmitted to the calling center via message 402 for completion through the calling center's communication infrastructure by a host application running on the calling center system. The host application dials the number(s) and adds them to the customer contact, as indicated by messages 464 and 465 (FIG. 4B). At this point, customer 410, business partner 430, attorney 440 and service agent in contact center 420 are all connected into the same phone call;

4) At some point, customer 410 may want to have a private discussion 461 (FIG. 4B) with the business partner 430 and/or attorney 440 in order to decide whether to accept an offer from the service agent. In this situation, customer 410 would select the "Private Conversation" feature. The Customer Service Infrastructure received the request and temporarily excludes the service agent in contact center 420 from the telephone call. The service agent may be notified via message 462;

5) Customer 410, business partner 430 and attorney 440 consult in private, without the service agent, and make certain decisions;

6) Customer 410 selects the "Public Conversation" feature and the customer service agent in added back into the conversation. The service agent may be notified via message 463;

7) Customer 410 resumes conversation with the financial institution through the service agent, and negotiations continue or agreement is reached; and 8) Business is completed and the telephone call may end.

In the process described above, which is in accordance with an embodiment of the present invention, the kind of 2.0 Device is not limited. Other kinds of compatible 2.0 devices may be usable, and other kinds of services may become feasible depending on the capabilities of the devices. For instance, devices having a graphical display and a pen input may be able to support a collaborative document review and approval process, while being able to add outside experts depending upon the subject matter of portions of the document under review or approval.

In a further example in accordance with an embodiment of the present invention, devices having an audio recording capability may be used. Devices having this capability would be useful for recording a customer contact session for later review and archiving.

In a further example in accordance with an embodiment of the present invention, devices having a speech to text engine would be useful in order to produce a written transcript of the conversation. Devices having a text to speech engine would be useful in order to allow sight-impaired persons to participate in the customer contact.

Example Scenario 1B

A Financial Transaction Using a Customer Communication Infrastructure

FIG. 4C illustrates a scenario 450 in which the customer's own communication infrastructure 451 is used to contact outside advisors 452 and bring them into a telephone call between the customer 453 and customer service agent 454. For example, customer 453 may use his own mobile device to check the presence information of outside advisors 452 and/or call outside advisors 452, add them to his call, then notify the customer service agent 454 that outside advisors 452 have been added.

Figure 5:
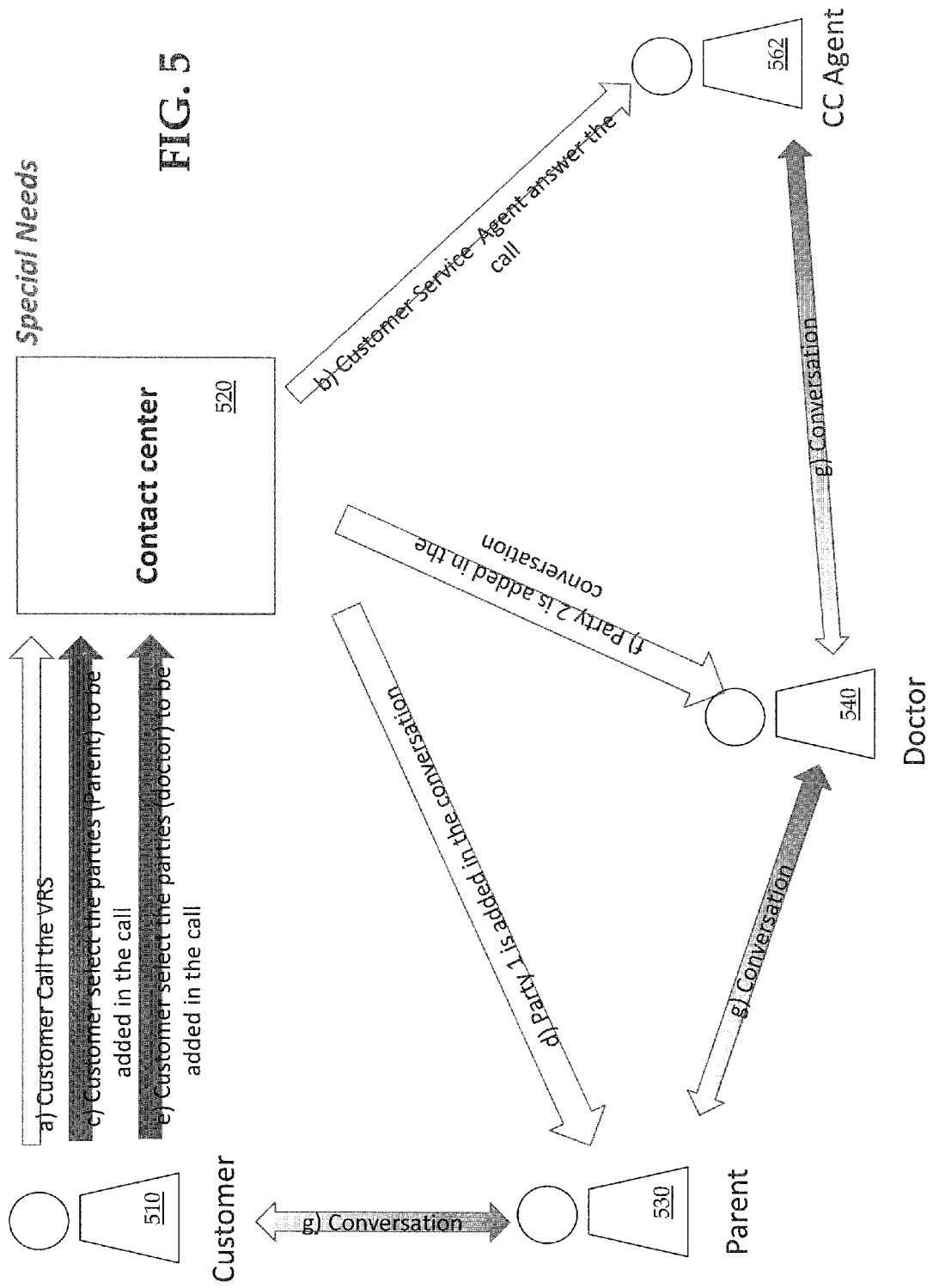
FIG. 5 is an example of establishing and conducting a transaction in a special needs situation, in accordance with an embodiment of the present invention.

Example Scenario 2 (FIG. 5)

A Special Needs Situation

As discussed above, embodiments of the present invention are not limited in the kind of device(s), so future applications using newly developed devices will not be limited due to limitations of the process.

In a special needs scenario, a hearing impaired person who understands and uses sign language can benefit by having access to an on-demand sign language service or video closed captioning service in order to act as a translator. In this situation, a hearing impaired person can add an outside party (e.g., a parent, doctor, etc.) to the customer contact, either video or voice, in order to be able to request support from a person who ordinarily may not have sign language skills. Conventionally, handling this situation according to known art may involve the following steps:

1) A hearing impaired person may contact a contact center and request a Video Rely Service ("VRS") using a compatible device;

2) A service agent in the contact center will start interacting with the Customer;

3) The customer will request that the service agent add to the phone call a person who is able to help the customer, for instance a parent. The selection may consider the time and the possible error in communicating from person-to-person in order to share information (e.g., phone numbers, addresses, etc.), and possibly communicate the emotional and/or physical situation, such as an emergency situation;

4) The service agent will call the parent and add him or her into the conversation;

5) The customer in accordance with the parent may decide to add to the phone call a doctor in order to get support;

6) The customer or parent will request that the service agent add the doctor into the call;

7) The service agent will call the doctor and add him or her into the conversation;

8) The discussion takes place jointly between the customer, the service agent, the parent and the doctor; and 9) Call ends.

Embodiments of the present invention described below in the context of a special needs or social call may be able to simplify the steps needed to perform the embodiment, compared to known processes. As applied to completing a call for a hearing impaired person, embodiments of the present invention may decrease the time to communicate with the hearing impaired person, and reduce error in obtaining this information in sign language.

Although described below in terms of a telephone call, it should be understood that embodiments of the present invention are not limited in this respect, and may include other communication methods such as a web chat. FIG. 5 illustrates an example of establishing and conducting such a transaction in accordance with an embodiment of the present invention, as described by the following steps:

1) The customer 510, a hearing impaired person, will call a contact center 520 and request Video Rely Service (VRS) using a Device 2.0;

2) A service agent 562 at the contact center 520 will start interacting with customer 510;

3) Customer 510 will request that the calling center infrastructure bring into the telephone call an outside party such as parent 530 or doctor 540;

4) The communication infrastructure of the contact center 520 will receive the request from customer 510 referred to in step 3 immediately above to add an outside party (e.g., parent 530) to the telephone call, and the contact center system will call parent 530 and add him/her to the telephone call;

5) The customer 510, in consultation with the parent, may decide to add a doctor 540 to the telephone call for consultation;

6) The communication infrastructure of the contact center 520 will receive the request referred to in step 5 immediately above to add doctor 540, will call doctor 540, and then will add doctor 540 to the telephone call; and 7) The telephone call takes place between customer 510, parent 530, and doctor 540. Optionally, certain portions of this telephone call may be marked as private (not shown in FIG. 5) such that the service agent 562 is not allowed to participate in the private portions.

Example Scenario 3 (Not Illustrated)

Contractor, Subcontractor and End-Customer Interaction

There is now described below a home contractor scenario in which the coordination among parties may be improved by application of an embodiment of the present invention. This scenario involves four parties: a client, a contractor, a sub-contractor and a supplier. With respect to nomenclature used above, the contractor is the "customer" and the supplier is the "enterprise" with empowered customer capabilities.

First, a problem is described below, and a problem resolution is described with respect to known methods. This will then be contrasted with respect to a method in accordance with an embodiment of the present invention.

In the present building contractor scenario, a fencing contractor works with a client to select a style of fencing around the client's property. Assume the client chooses fencing style "X". Conventionally, handling this situation according to known art may involve the following steps and/or calls:

Call 1: Contractor calls his supplier to place an order for 800 feet of fencing style "X". Agent reports that they have insufficient inventory and that it will be 10 days before new stock is available. Agent reports that fencing style "Y" is very similar and is currently being offered at a 30% discount.

Call 2: Contractor calls client and explains situation. Client asks if fencing style "Y" also comes with a 10-year warranty.

Call 3: Contractor calls supplier with question about warranty.

Call 4: Contractor calls client to confirm that the warranty is the same. Client says to go ahead with fencing style "Y".

Call 5: Contractor calls supplier and places order.

Call 6: Contractor calls sub-contractor to request that they schedule a pickup of this fencing from the supplier and gives order number.

Call 7: Sub-contractor calls supplier to arrange pick up and schedule installation.

Call 8: Contractor calls sub-contractor later to check that pickup has been agreed.

Call 9: Contractor calls client to confirm installation date.

In contrast, a process in accordance with an embodiment of the present invention may include the following steps:

Call 1: A contractor representing an end-customer calls the supplier to place an order. A customer service agent representing the supplier reports an inventory problem. The contractor adds the end-customer to the call. The end-customer asks about a warranty for the substitute product and then approves the product substitution. The contractor adds the sub-contractor to the call. The sub-contractor, customer service agent and end-customer mutually agree to the best pickup and installation date.

Optionally in Example Scenario 3, the contractor may activate a call recording capabilities in order to record the agreement between all the parties. The recording may serve as evidence of a binding agreement and it may be made available to everyone in the conversation.

Optionally in Example Scenario 3, the contractor may activate a private conversation capability to have a private discussion with the client, for instance to provide advice about the substitute product. The recording capability, if enabled, may be disabled by default during the private conversation, but may be selectively enabled.

In Example Scenario 3, nine calls have been reduced to one call, with improved business agility and improved communication between parties.

Example Scenario 4

Feedback Rating of a Customer Contact

This example involves four parties: a customer, a first contact center service agent, a second contact center service agent and a supervisor. This example scenario illustrates the customer utilizing the "empowered customer" feature.

1) The customer calls the contact center and communicates with the first contact center service agent.

2) The customer provides a feedback rating of the service received by the customer during the call. Feedback may be provided during the call so that an appropriate response can be taken immediately by the calling center. Feedback may include a ranking (e.g., a numerical ranking from 1 to 5; or a subjective ranking such as good/fair/poor, etc.); or a request for specific action (e.g., speak to a specific person or level of person). The appropriate response may include:

2a) Add a supervisor to the call, for instance if there is a problem that the first customer service agent is not empowered to resolve;

2b) Replace the first customer service agent with a second customer service agent, for instance if the first customer service agent lacks certain skills needed to address the problem from the customer;

2c) Incentivize the customer service agents by including a bonus if the customer rating meets or exceeds a predetermined threshold during a period of time such as one day; and 2d) Dynamically changing or adapting the call distribution algorithm from the most skilled into the most rated agent. For example, calling centers presently tend to deliver a call based on the most skilled agent, such that the call will go first to an agent that has a higher skill rating. However, this rating may not reflect the customer's opinion about the agent. Therefore, an embodiment in accordance with the present invention may use an evaluation provided by the customers rather than an evaluation provided by the supervisor of the calling center, etc.

In Example Scenario 4, the customer is actively using the feedback ratings in order to adaptively affect how the contact center will route and process customer calls. Optionally, the feedback rating can also be used to Incentivize the individual service agents to provide improved customer service.

Example Scenario 5

Adding a Party Based on Presence Information

This example scenario includes three parties: a customer, a contact center service agent and a customer advisor. This example scenario uses a customer Presence Services such as, but not limited to, Skype™ or Microsoft Messenger™. A presence service is known as a network service which accepts, stores and distributes presence information. Presence information is known as a status indicator that conveys ability and willingness of a user or other potential communication partner to communicate. Presence information may include a listing of the best communication method to be reached (e.g., phone, text message, instant messaging, etc.). A user's client provides presence information via a network connection to a presence service, and can be made available for distribution to other users to convey an availability for communication.

In this scenario the customer contacts a contact center from a mobile device such as a PDA or smart phone in order to transact business (e.g., make a reservation). Presence information regarding friends of the customer is available to the customer but not to the contact center.

To begin, the customer calls the contact center and speaks with a call center service agent. During the call, the customer may realize that he needs to consult with an advisor. The customer may use his mobile device to consult the presence service, in order to determine whether his advisor is available and willing to advise, and if so what is best method to reach him (e.g., phone, text message, instant messaging, etc.).

If the advisor is available and willing, then the customer transmits the telephone number of the advisor to the calling center. The calling center receives the telephone number to be added to the conversation, and uses its own communication service infrastructure to make the call to the advisor. If the advisor answers the phone, then the advisor is added to the call. The customer is then able to consult with the advisor. At this point, the customer, the advisor, and the calling center service agent are all joined into the same conversation.

If the advisor is not available or not willing, the customer may still try to add the advisor to the call, but the advisor will not answer the call. In this situation, the customer transmits the telephone number of the advisor to the calling center. The calling center receives the telephone number to be added to the conversation, and uses its own communication service infrastructure to make the call to the advisor. The advisor does not answer the phone, so the advisor is not added to the call. The customer is then unable to consult with the advisor. At this point, only the customer and the calling center service agent are joined into the conversation.

As this scenario demonstrates, the customer has been able to add his advisor (if available) into the phone call in order to benefit from additional advice. By utilizing presence information, the customer is more assured of being able to join the advisor to the telephone call if the advisor is available, thereby providing a more efficient process. Furthermore, through the presence information, the advisor is able to publicize the best communication method to be reached (e.g., phone, text message, instant messaging, etc.) and the customer is able to contact the advisor by way of the preferred communication method.

Figure 6:
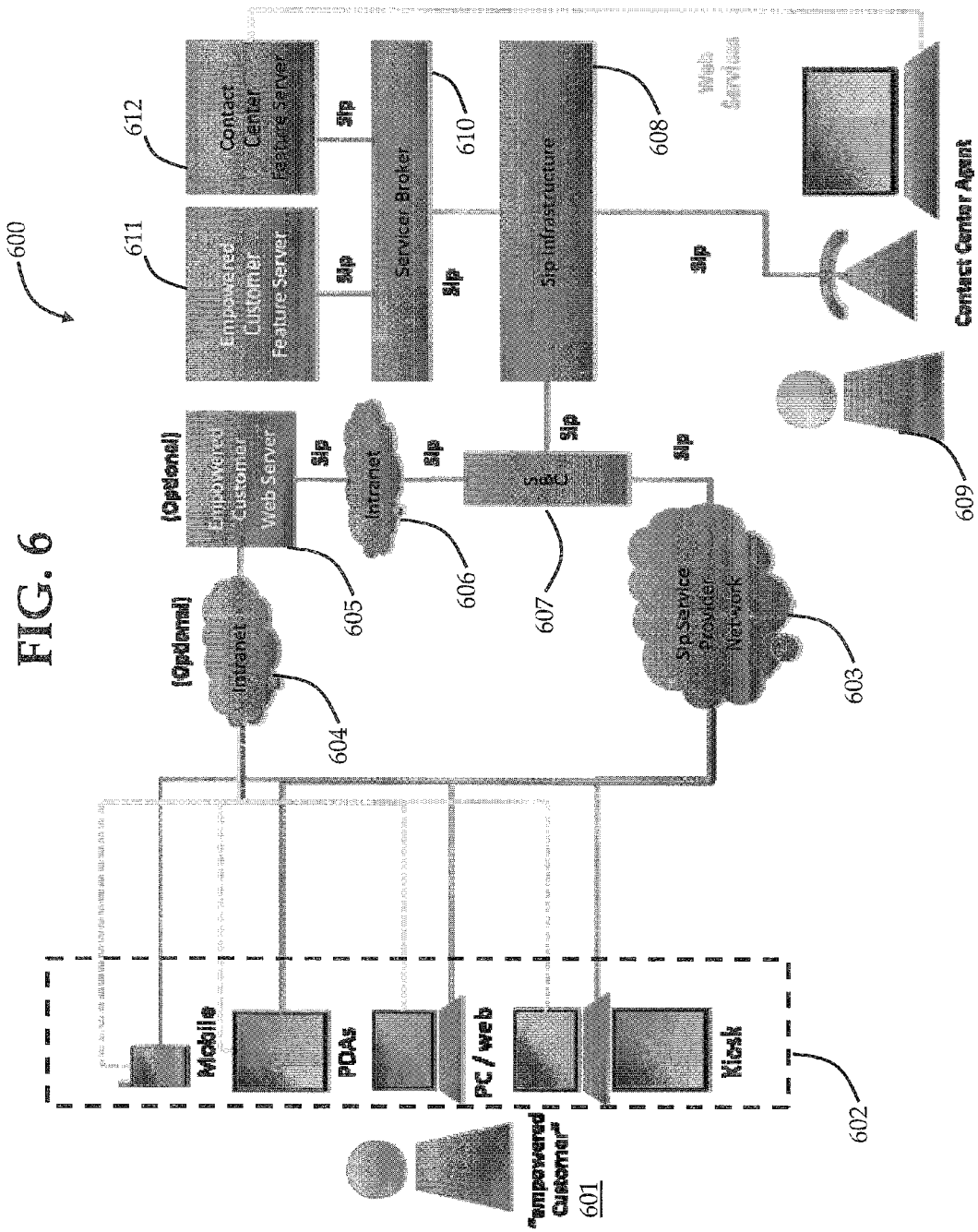
FIG. 6 is an architecture of a system in accordance with an embodiment of the present invention.

FIG. 6 illustrates an architecture of system 600 in accordance with an embodiment of the present invention. The design of system 600 takes into account at least three considerations:

First, by reason of operating a contact center, the vendor already owns and operates a contact center feature server. An architecture in accordance with an embodiment of the present invention should be able to desegregate (i.e., to partition) the present invention from the existing contact center infrastructure. Doing so will allow the present invention to be implemented by software modules executing on the contact center server. This has the further advantage of allowing the present invention to be implemented on a wide variety of hardware platforms.

Second, embodiments of the present invention are usable in either a pure "end-to-end" SIP infrastructure, or in a hybrid infrastructure that includes SIP as well as non-SIP network elements.

Third, embodiments of the present invention are usable with multiple types of customer access devices, and provide a similar user experience when using these different devices. Customer access devices include mobile phones, smart phones, PDAs, PCs (as either a client app or web app), and kiosks devices.

Referring again to FIG. 6, system 600 is configured to be capable of receiving communicating with an empowered customer 601, who is using one or more of communication devices 602. Communication devices 602 are in communication with system 600 via a SIP service provider network 603 and/or an internet 604 (or intranet 604 depending on deployment configuration).

In an embodiment of the present invention, SIP service provider network 603 converts the incoming communication from the mobile devices into an SIP format, and then the communication is sent to a session board controller 607 ("SBC"). If a mobile communication device 602 is in communication with system 600 via intranet 604, then the communication is routed through an empowered customer web server 605, which is described below in greater detail. Intranet 604 and web server 605 are optional (as shown in FIG. 6) together as a pair, not individually optional. The output of web server 605 is routed via intranet 606 to SBC 607. SBC is a module that performs a security communication function in order not to expose the customer infrastructure directly to the service provider network. SBC 607 communicates with the SIP infrastructure 608, which provides known building blocks of SIP technology (not illustrated), including but not limited to: SIP user agents; SIP proxy servers; re-direct servers; location servers; presence servers; and feature servers. The contact center service agent 609 is in communication with SIP infrastructure 608. SIP 608 is also in communication with service broker 610. A role of service broker 610 is to co-ordinate the invocation and interaction of user features hosted by empowered customer feature server 611 (which is described below in greater detail) and contact center feature server 612. SIP messages pass through the Service Broker as each application is accessed.

Embodiments of the present invention rely upon functionality provided by the empowered customer feature server 611 and the empowered customer web server 605.

The empowered customer feature server 611 ("feature server 611") is a SIP Application module running on SIP server. It is configured to receive a customer request in form of SIP message "INFO" or "UPDATE", and then deliver the requested feature. Feature server 611 will act as a back-to-back user agent (B2BUA), staying engaged for the entire customer conversation.

The empowered customer web server 605 ("web server 605") is a module designed to support a hybrid architecture model in a not-fully-SIP network. Web server 605 may or may not be co-resident with the empowered customer feature server 611. Web server 605 operates by exposing a web service to the internet in order to allow the customer to pass the request over a standard internet data connection. Web server 605 transforms the data request into a SIP message and delivers it to the SIP control layer. As used herein, the SIP control layer may refer to a layer that can control the conversation. For example, there are typically three layers: an access layer (e.g., PSTN, devices, etc.); a control layer (e.g., registers, proxies, etc.) and an application layer (e.g., UC feature server, contact center feature Server, etc.). Feature server 611 and web server 605 together facilitate spreading the user experience across the heterogeneous devices discussed above.

Embodiments of the present invention are operable both in a fully SIP network and in a hybrid network that contains non-SIP elements. In particular, if embodiments of the present invention are operating in a hybrid network, then web server 605 should be used.

FIG. 7 illustrates an embodiment of a call flow diagram at a low level of abstraction, in accordance with the present invention. Messaging details comply with RFC 3261, discussed earlier. In particular, FIG. 7 illustrates a typical call scenario for an "Empowered Customer" service in a fully SIP architecture. A "Device 2.0" is used by the customer to make a telephone call, and is capable of sending "SIP UPDATE" messages during the call. The "SIP UPDATE" message is used to deliver to a Feature Server the instructions needed to perform actions requested by the customer, such as: adding a party; dropping a party; mute a party; record a call; make a call private; request a copy of a recording; request a survey at the end in order to provide feedback; and rate a call.

FIG. 8 illustrates another embodiment of a call flow diagram at a low level of abstraction, in accordance with the present invention. Messaging details comply with RFC 3261, discussed earlier. In particular, FIG. 8 illustrates a call scenario for the "Empowered Customer" service in a hybrid architecture, in particular by use of the "Empowered Customer" application web server 605, as previously described in connection with FIG. 6.

The hybrid scenario is one in which many customers and/or Service Providers will use, due the lack of a full end-to-end SIP infrastructure, or because the customer lacks a Device 2.0 having the capabilities to generate and handle SIP messages.

FIG. 8 differs from FIG. 7 at least in that the "Empowered Customer" application web server will receive a customer request (in form of Web Services Call) and will translate the customer request into an equivalent "SIP UPDATE" Message. The "SIP UPDATE" message is then used to deliver to the "Empowered Customer" Feature Server the instructions based on the action requested by the customer, such as: adding a party; dropping a party; mute a party; record a call; make a call private; request a copy of a recording; request a survey at the end in order to provide feedback; and rate a call.

Embodiments of the present invention include a system having one or more processing units coupled to one or more memories. The one or more memories may be configured to store software that, when executed by the one or more processing unit, allows a customer to share control in customer service scenarios, at least by use of processes described above in FIG. 2C through FIG. 8, and related text.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to share control of a customer service provided by a contact center, comprising:
  receiving, from a customer, a customer contact to request the customer service;
  communicating by use of a communication channel between the customer and the contact center in order to establish the customer service;
  conducting, by control of an agent of the contact center, the established customer service in an ongoing manner;
  receiving a join request, from the customer, to join an outside party to the customer service, wherein the outside party is selected by the customer;
  joining the outside party to the established and ongoing customer service, by customer control of the contact center;
  receiving, from the customer, a command to temporarily exclude the agent of the contact center from access to the established and ongoing customer service; and
  after the agent of the contact center has been excluded, receiving from the customer a command to add the agent of the contact center to the established and ongoing customer service.

2. The method of claim 1, wherein the outside party joins the customer service by use of a communication channel controlled by the contact center.

3. The method of claim 1, wherein the outside party joins the customer service by use of a communication channel controlled by the customer.

4. The method of claim 1, further comprising:
  permitting access by the customer to a presence status of the outside party,
  wherein the presence status comprises a status indicator that conveys ability and willingness of the outside party unaffiliated with the contact center to communicate, and
  wherein the join request is received if the presence status indicates that the outside party is available.

5. The method of claim 1, further comprising: limiting control of the customer service allowed to the customer.

6. The method of claim 1, further comprising: approving the outside party before the outside party is joined to the customer service.

7. The method of claim 1, further comprising: receiving an on-call status of an outside party.

8. The method of claim 1, further comprising: creating a recording of the customer service in response to an activate-recording command received from the customer.

9. The method of claim 8, further comprising: providing the recording in response to a recording request from the customer.

10. The method of claim 1, further comprising: providing a feedback survey in response to a feedback survey request received from the customer.

11. The method of claim 10, wherein the feedback survey is provided before the completion of the customer contact.

12. The method of claim 1, wherein the communication channel configured to receive the customer contact, and the communication channel configured to provide the customer service, are in communication with an application web server.

13. A system to share control of a customer service, comprising:
a communication channel receiver configured to receive a customer contact to request service;
a communication channel transmitter configured to establish the customer service over a communication channel;
a processor configured to conduct, by control of an agent of the contact center, the established customer service in an ongoing manner;
a communication module configured to receive a join request, from the customer, to join an outside party to the established and ongoing customer service, wherein the outside party is selected by the customer;
a joining module configured to join the outside party to the customer service, wherein the joining module is controlled by the customer
a receiver configured to receive, from the customer:
a command to temporarily exclude the agent of the contact center from access to the established and ongoing customer service; and
after the agent of the contact center has been excluded, a command to add the agent of the contact center to the established and ongoing customer service.

14. The system of claim 13, wherein the joining module joins the outside party by use of a communication channel controlled by the system.

15. The system of claim 13, wherein the joining module joins the outside party by use of a communication channel controlled by a customer.

16. The system of claim 13, further comprising:
a presence determination module configured to determine a presence status of the outside party,
wherein the presence status comprises a status indicator that conveys ability and willingness of the outside party unaffiliated with the contact center to communicate, and
wherein the joining module joins the outside party if the presence status indicates that the outside party is available.

17. The system of claim 13, further comprising: a limiting module configured to limit control of the system allowed to a customer.

18. The system of claim 13, further comprising an approval module configured: to analyze the outside party; and to permit joining the outside party by the joining module only if approved by the approval module.

19. The system of claim 13, wherein the system is configured to receive an on-call status of an outside party.

20. The system of claim 13, further comprising a recording module configured to record the customer service in response to an activate-recording command received from a customer.

21. The system of claim 20, wherein the recording is provided in response to a recording request from the customer.

22. The system of claim 13, further comprising a survey module configured to provide a feedback survey in response to a feedback survey request received from a customer.

23. The system of claim 22, wherein the feedback survey is provided before the completion of the customer contact.

24. The system of claim 13, further comprising an application web server in communication with: the communication channel configured to receive the customer contact; and with the communication channel configured to transmit the customer service.

25. A system, comprising a computer server, the computer server comprising a tangible computer readable medium comprising program instructions, wherein the program instructions are computer-executable to implement:
receiving, from a customer, a customer contact to request the customer service;
communicating by use of a communication channel between the customer and the contact center in order to establish the customer service;
conducting, by control of an agent of the contact center, the established customer service in an ongoing manner;
receiving a join request, from the customer, to join an outside party to the customer service, wherein the outside party is selected by the customer;
joining the outside party to the established and ongoing customer service, by customer control of the contact center;
receiving, from the customer, a command to temporarily exclude the agent of the contact center from access to the established and ongoing customer service; and
after the agent of the contact center has been excluded, receiving from the customer a command to add the agent of the contact center to the established and ongoing customer service.

26. The system of claim 25, further comprising: an application web server configured to communicate with the customer.

* * * * *